United States Patent
Kerns et al.

(10) Patent No.: US 9,055,348 B1
(45) Date of Patent: Jun. 9, 2015

(54) DISTRIBUTION OF VIDEO ADS IN A PLAYLIST FORMAT

(75) Inventors: Jamieson Kerns, Santa Monica, CA (US); Nicola Ann Crane, San Francisco, CA (US); Alexandra Jane Crane, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/465,817

(22) Filed: May 7, 2012

Related U.S. Application Data

(60) Provisional application No. 61/565,199, filed on Nov. 30, 2011.

(51) Int. Cl.
*H04N 7/10* (2006.01)
*H04N 21/81* (2011.01)

(52) U.S. Cl.
CPC .................................. *H04N 21/812* (2013.01)

(58) Field of Classification Search
CPC ..................................................... H04N 21/812
USPC ........................................................ 725/32, 36
See application file for complete search history.

(56) References Cited

U.S. PATENT DOCUMENTS

| | | | |
|---|---|---|---|
| 8,788,355 B2 * | 7/2014 | Nakamura et al. ........... 705/26.1 |
| 2003/0149975 A1 * | 8/2003 | Eldering et al. ................ 725/34 |
| 2005/0039206 A1 * | 2/2005 | Opdycke ......................... 725/35 |
| 2008/0196060 A1 * | 8/2008 | Varghese ........................ 725/34 |
| 2010/0228592 A1 * | 9/2010 | Anderson et al. ............... 705/10 |
| 2011/0093885 A1 * | 4/2011 | Ravula ............................ 725/32 |
| 2012/0124618 A1 * | 5/2012 | Ruiz-Velasco et al. ......... 725/32 |
| 2012/0297417 A1 * | 11/2012 | Philpott et al. ................. 725/34 |
| 2013/0097634 A1 * | 4/2013 | Jin et al. ......................... 725/34 |

* cited by examiner

*Primary Examiner* — Nasser Goodarzi
*Assistant Examiner* — Michael Hong
(74) *Attorney, Agent, or Firm* — Lowenstein Sandler LLP

(57) ABSTRACT

This disclosure generally relates to systems and methods for distribution of video ads of a playlist of video ads.

20 Claims, 7 Drawing Sheets

DISTRIBUTION OF VIDEO ADS IN A PLAYLIST FORMAT

CROSS-REFERENCE TO RELATED APPLICATION

This application claims priority to U.S. Provisional Patent Application No. 61/565,199, filed on Nov. 30, 2011, and entitled "DISTRIBUTION OF VIDEO ADS IN A PLAYLIST FORMAT". The entirety of the above referenced provisional application is incorporated herein by reference.

TECHNICAL FIELD

This disclosure generally relates to systems and methods for distribution of video ads of a playlist of video ads.

BACKGROUND

Conventionally, clicking on a video ad often simply shows a user one video for a particular advertiser. However, if the user is interested in the video ad it may be difficult for him to replay the video ad or to find related content after watching the video ad. Consequently, such conventional framework for display of video ads can result in opportunity costs associated with not further targeting the user with additional ads when he is at point of purchase, or heightened interest in the advertised content.

SUMMARY

A simplified summary is provided herein to help enable a basic or general understanding of various aspects of exemplary non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a presentation component associates one or more video advertisements with a playlist, a playlist component monitors watching of the one or more video advertisements by a user, an ordering component determines an order for respective unwatched video advertisements of the playlist for viewing by the user based on the monitoring, and the presentation component presents a subset of the unwatched video advertisements of the playlist to the user for viewing based on the determined order.

In accordance with another non-limiting implementation, one or more video advertisements are associated with a playlist, watching of the one or more video advertisements by a user is monitored, an order for respective unwatched video advertisements of the playlist for viewing by the user is determined based on the monitoring, and a subset of the unwatched video advertisements of the playlist are presented to the user for viewing based on the determined order.

These and other implementations and embodiments are described in more detail below.

DETAILED DESCRIPTION

Overview

Figure 1:
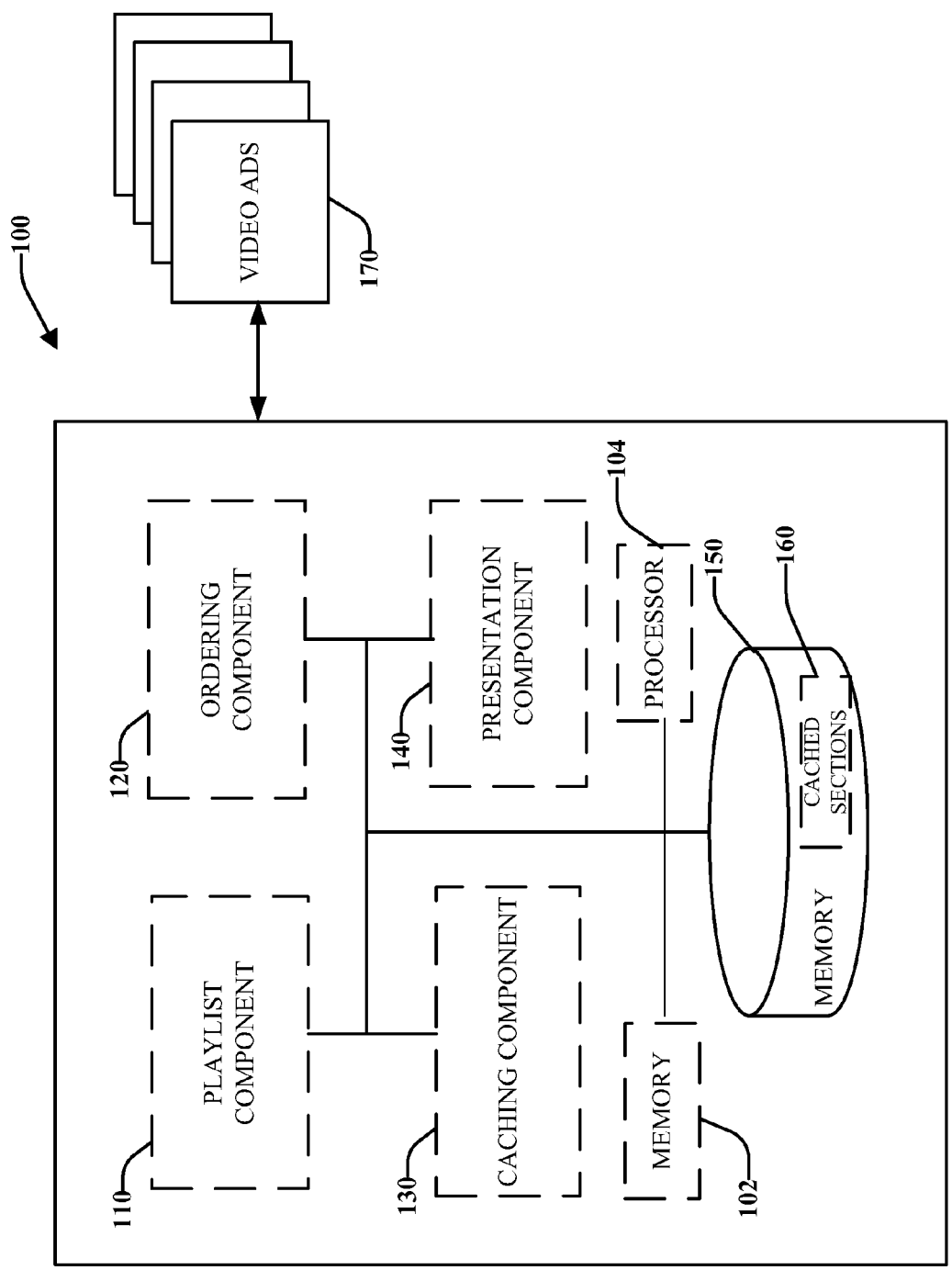
FIG. 1 illustrates a block diagram of an exemplary non-limiting system for providing advertising content based on a playlist format in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

By way of introduction, the subject matter described in this disclosure relates to presentation of video advertisements (e.g., promoted videos, video ads) in a playlist format. Conventionally, clicking on a video ad often simply shows a user one video for a particular advertiser. However, if the user is interested in the video ad it may be difficult for him to replay the video ad or to find related content after watching the video ad. Consequently, such conventional framework for display of video ads can result in opportunity costs associated with not further targeting the user with additional ads when he is at point of purchase, or heightened interest in the advertised content.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

In accordance with an embodiment, a system displays to users a playlist of video ads and/or associates the playlist with one or more promoted videos. When a user clicks on one of the promoted videos, the user can watch the video, and since the video is associated with the playlist of video ads, remaining unwatched video ads of the playlist are presented to the user for viewing as well as interacting with the advertisements (e.g., to make purchases). By making available additional associated video ads available for immediate viewing to the user, an advertiser can potentially increase purchase activity by users as well as increase brand awareness. Moreover, since charges for advertising impressions are often based on a charge per view basis, revenue associated with hosting the playlist of ads can be increased per advertiser since the user is viewing more ads from the particular advertiser as a result of watching the playlist of ads.

Example Tailored Advertising Content Distribution Based on a Playlist Format

Referring now to the drawings, with reference initially to FIG. 1, an advertising delivery system 100 is shown that facilitates providing advertising content based on a playlist format. Aspects of the systems, apparatuses or processes explained in this disclosure can constitute machine-executable component(s) embodied within machine(s), e.g., embodied in one or more computer readable mediums (or media) associated with one or more machines, non-limiting examples of which are illustrated in relation to FIGS. 6 and 7. Such component, when executed by the one or more machines, e.g., computer(s), computing device(s), virtual machine(s), etc. can cause the machine(s) to perform the operations described. Advertising delivery system 100 can include memory 102 for storing computer executable components and instructions. A processor 104 can facilitate operation of the computer executable components and instructions by the advertising delivery system 100.

In a non-limiting example, advertising delivery system 100 employs a playlist component 110, an ordering component 120, a caching component 130, and a presentation component 140. In an aspect, playlist component 110 monitors user views and/or selections in connection with one or more video ads associated with a playlist of the video ads 170. Ordering component 120 orders (ranks) respective video ads of the playlist 170 (e.g., as a function of determined or inferred user interest, user context, relevance to user, likelihood of purchasing, reinforcing brand strength, resource capabilities and limitations, or other criteria), caching component 130 can cache respective video ads as a function of the ranking (e.g., to improve streaming speed, bandwidth utilization, or resource allocation), and presentation component 140 transmits or presents respective video ads of the playlist (e.g., as a function of the ordering, user selection, resource capabilities and limitations, or other criteria). Additionally, advertising delivery system 100 includes a memory 150 that can store video ads and playlists, as well as, data generated by playlist component 110, ordering component 120, caching component 130, and presentation component 140. Memory 150 can be stored on any suitable type of storage device, non-limiting examples of which are illustrated with reference to FIGS. 6 and 7.

The video ads 170 can include data associated with one or more data sources (not shown) that can be accessed by a client device(s) (not shown) or by an advertising delivery system(s) 100 (and additional systems described in this disclosure). For example, a data source can include a data store storing media content and affiliated with a content provider that interacts with the advertising delivery system 100. In another aspect, a data source can include a data store that stores media content remote from a content provider or an advertising delivery system 100.

A client device can include any suitable computing device associated with a user and configured to interact with or receive media content and video ads. For example, a client device can include a mobile device, a mobile phone, personal data assistant, laptop computer, tablet computer, desktop computer, server system, cable set top box, satellite set top box, cable modem, television set, media extender device, blu-ray device, DVD (digital versatile disc or digital video disc) device, compact disc device, video game system, audio/video receiver, radio device, portable music player, navigation system, car stereo, etc. Moreover, a client device can include a user interface (e.g., a web browser or application), that can receive and present displays and generated locally or remotely. It is to be appreciated that advertising delivery system 100 can be remote from the client device or can be included within the client device. As used in this disclosure, the terms "content consumer" or "user" refer to a person, entity, system, or combination thereof that employ advertising delivery system 100 (or additional systems described in this disclosure). In an aspect, a client device or advertising delivery system 100 (or additional systems described in this disclosure) can be configured to access the video ads 170 via a wired or wireless network, such as for example the Internet, intranet, or cellular service.

Playlist component 110 can monitor user viewing, browsing, selection, and other interactions with video ads and playlists of video ads. In a non-limiting example, playlist component 110 can monitor a user moving a pointer over a video ad and pausing for an amount of time. In another non-limiting example, playlist component 110 can monitor a user selecting a video ad and/or employing playback controls, such as rewind, play, pause, stop, or forward. In a further example, playlist component 110 can monitor a user browsing a playlist of video ads, such as using scrolling controls. Furthermore, playlist component 110 can monitor user purchases from video ads, tagging video ads, adding annotations or comments to video ads, sharing video ads, linking to video ads, indicating like or dislike of video ads, rating video ads, etc. In addition, playlist component 110 can generate logs and/or user profiles tracking information gathered from the monitoring.

Caching component 130 can cache video ads in the memory 150 as a function of respective ordering of the video ads of the playlist of video ads 170. The caching component can store cached video ads so that future requests for respective video ads can be served quickly. The cached video ads can be duplicates of corresponding sections of original video ads which may be stored elsewhere. If the cached video ads are requested, the request can be served by simply reading the cache, which is comparatively faster than reading the original video ad files. Hence, the greater the number of requests that can be served from the cached section, the faster overall performance of advertising delivery system 100 becomes. The cached video ads can be aged out of or persisted in the memory 150 as a function of ranking, staleness, relevance, etc. For example, in order to free up memory, video ads that do not meet a ranking threshold, relevance threshold, or age threshold can be removed from memory 150. In a non-limiting example, multiple levels of cache can be employed; respective sections of media can be cached in respective caches as a function of ranking, ordering, demand, etc. For example, highest performance cache can be allocated to highest ranked and/or most in demand video ads.

In a non-limiting example, presentation component 140 can be configured to provide video ads of the playlist 170 to content consumers. In an aspect, presentation component 140 can provide cached video ads to content consumers. In an another aspect, the presentation component 140 can provide or filter video ads to respective content consumers as a function of inferred or determined user preferences, historical views, user context, user location, user queries, etc. In a non-limiting example, presentation component 140 can determine video ads that are likely to be of interest to a user, for example using artificial intelligence, by examining logs storing user interaction with content, non-limiting examples or which include, searches, navigation of a content, viewing content, browsing content, rating content, like indication of content, dislike indication of content, and/or comments or annotations applied to content. In another example, user preferences stored in a user profile and/or inferred by monitoring user interaction with the client device can be employed to determine video ads of interest to a user. In a further example, content consumer group profiles, or user profiles for a user and/or friends of a user can provide shared preference settings or inferences of video ads that are of interest to groups of users. It is to be appreciated that any criteria can be employed for determining which video ads may be of interest to a user. Moreover, presentation component 140 can identify to content consumers level of popularity of respective video ads of the playlist 170. Presentation component 140 can associated video ads to a playlist based upon determinations of user interest.

In another non-limiting example, presentation component 140 can be configured to present subsets of cached media content sections as a function of inferred or determined user interest. The inferred user interest can for example be based on user interaction with video ads such as for example, number of user views of the ad or similar ads, a record of content purchased from a particular advertiser by a user, users social network data, user bookmarks, user posts of a content section, or user tagging of a video ad, user context.

The presentation component 140 can be configured to present video ads of the playlist as a function of determined user interest (e.g., based on user declarations regarding interest or disinterest, user based rating, user based ranking . . . ). For example, a user may declare interest by rating an ad on a sliding scale, ranking a collection of video ads from favorite to least favorite, choosing content from a finite list of content choices, user created lists of liked user content. The presentation component 140 can thereby suggest video ads of the playlist based on such determined user interest. In another example, a user may explicitly subscribe to content updates for certain video ads.

Presentation component 140 can present various video advertising options as a function of the playlist component 110, ordering component 120, or caching component 130 so a user can be presented with or choose one or more video ads to view from the playlist 170. Additionally, presentation component 140 can present content viewing options for use with any suitable type of client device that receives media files.

Client devices often have different capabilities and limitations (e.g., screen size, processors, decoders . . . ). In an aspect, the presentation component 140 can provide presentation options in accordance with different client device capabilities or limitations. For example, data rendering capabilities may be more limited in a mobile device (e.g., a smartphone) than in a fixed computing device (e.g., a desktop computer), such as a larger percentage of client device processing resources may be required to present content such as a video (or other information) on the mobile device than would be required in viewing the same video on a fixed computing device. In addition, because displays of various mobile devices are often smaller and/or lower resolution than displays in fixed computing devices, it may be possible only to display a relatively small amount of information at any given time on a mobile device. Presentation component 140 can thus optimize display of options and content for respective devices. Furthermore, data connections between a mobile device and various networked resources (e.g., the Internet) may be slower than corresponding data connections between a fixed computing device and the same networked resources. Accordingly, presentation component 140 can generate user options to account for variations in device capabilities and available bandwidth for consumption and rendering of media content. For example, differing format or resolution versions of the same video ad can be presented based upon client device capabilities and limitations. In a non-limiting example, a video ad can be presented in a highly compressed video encoding format and with lower resolution to a mobile device over a wireless network, while a lower compressed video encoding format and higher resolution version of the same video ad can be presented to a desktop computer on a wired network.

In view of the above, in an aspect, presentation component 140 can present content in various formats and/or in accordance with various display mediums. In a non-limiting example, presentation component 140 can present a section of video in a format such as H.263, H.264 AVC, MPEG-4 SP, VP8, or other suitable format. In another non-limiting example, presentation component 140 may present an audio section in formats such as for example AAC LC/LTP, HE-AACv1(AAC+), HE-AACv2 (enhanced AAC+), AMR-NB, AMR-WB, FLAC, MP3, MIDI, Vorbis, PCM/WAVE, etc.

In a further non-limiting example, presentation component 140 can automatically configure or present user options to present video ads based on encoding parameters such as video resolution, video frame rate, video bit rate, video codec, audio codec, audio channels, audio bit rate, etc. Thus, presentation component 140 or a user may choose a format to receive content that best suits capabilities of specific communication mediums, available bandwidth, file size, processing capabilities, screen resolution, screen size, available encoders, available decoders, etc.

Although the innovations described in this disclosure are primarily presented within the context of a single advertiser, it is to be appreciated that the playlist 170 can include video advertisements from more than one advertiser. It is also to be appreciated that advertising delivery system 100 can deliver video ads and playlists of video ads to a plurality of client devices concurrently.

Figure 2:
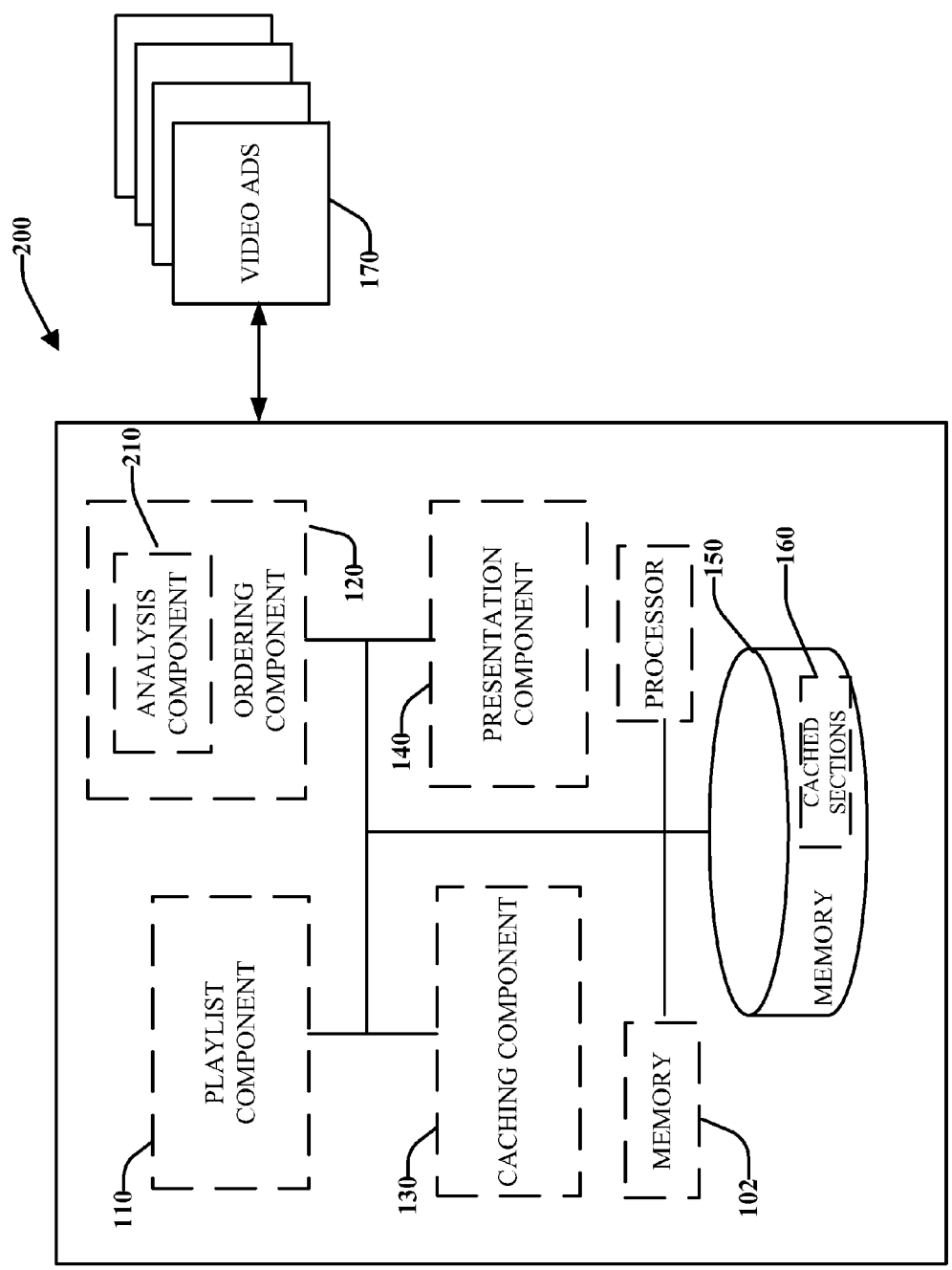
FIG. 2 illustrates a block diagram of an exemplary non-limiting system for identifying content sections of video ads and analyzing the video ads in connection with an ordering of the respective ads for presentation to a user in accordance with an implementation of this disclosure.

Turning now to FIG. 2, presented is another non-limiting example of an advertising delivery system 200 in accordance with the subject disclosure. Advertising delivery system 200 employs playlist component 110, ordering component 120, analysis component 210, caching component 130, presentation component 140, memory 102, memory 150, and cached sections 160. In an aspect, advertising delivery system 200 facilitates identifying content sections of video ads and analyzing the video ads in connection with an ordering of the respective ads for presentation to a user. Ordering component 120 employs an analysis component 210 to facilitate analyzing monitored information in connection with ordering the respective video ads of the playlist. Analysis component 210 can, for example, analyze ranked sections of the video ads of the playlist 170, and facilitate categorizing or indexing the ordered video ads. For example, the analysis component 210 can facilitate categorizing respective video ads as highly or lowly ranked in connection with respective categories (groups) of content consumers. A particular video ad selection can be ranked highly for one group of content consumers and deemed of low interest to another group of content consumers.

In a non-limiting example, analysis component 210 can analyze the video ads, monitoring information, and ranking and ordering information to facilitate fine-tuning the ordering of video ads for particular content consumer groups (e.g., based on demographics, social interests, preferences, affiliations, etc.). Further, a ranking or ordering of respective video ads can account for different characteristics of content, user contexts, user interests, and perspectives of a user. Non-limiting examples of other information that may be employed in analyzing, ranking, and/or ordering video ads can include metadata associated with or determined from analysis of a video ad (e.g. content, subject matter, comments, annotations, keywords, advertiser, purchasing information, etc.), time period (e.g., time of day, or day of the week), user location (e.g., to more heavily weight video ads associated with products or services in close geographical proximity to the user), selection of the video ad(s) by previous users (e.g., users querying for the same or similar terms), and whether the video ad is available for playback (e.g., video articles available for playback are weighted more heavily). Analysis component 210 can also facilitate ranking or ordering video ads based on quality metrics (e.g., media format, media quality, rendering device capabilities, media encoding, video or audio resolution, file size, playback duration, etc.).

In another non-limiting example, analysis component 210 can determine user viewing intent, for example, based on user preferences. User preferences can be basic information about characteristics, attributes or categorization of content that respective users prefer to receive. User preference may also include format of content, type of content interface preferred, display resolution, video quality, audio quality, bit rate, number of frames per second, aspect ratio, scaling formats, audio output options, display options, playback duration, and other preferential information. Furthermore, user preference can factor determined user viewing intent by filtering content according to user preference. For example, a user of video content may prefer to view only videos in high definition (HD) format; thus analysis component 210 can filter out video ads that are not in HD format, or alternatively up-weight ranking of HD formatted content over non-HD formatted media.

In a non-limiting example, ordering component 120 can generate and store profiles for content consumer groups to retain results from analysis component 210, for example, identified preferences, rankings, orderings each content consumer group. Furthermore, ordering component 120 can generate and store profiles for users to retain, for example, content consumer groups associated with a user. Presentation component 140 can employ content consumer group profiles and user profiles to determine video ads to present in a playlist.

Figure 3:
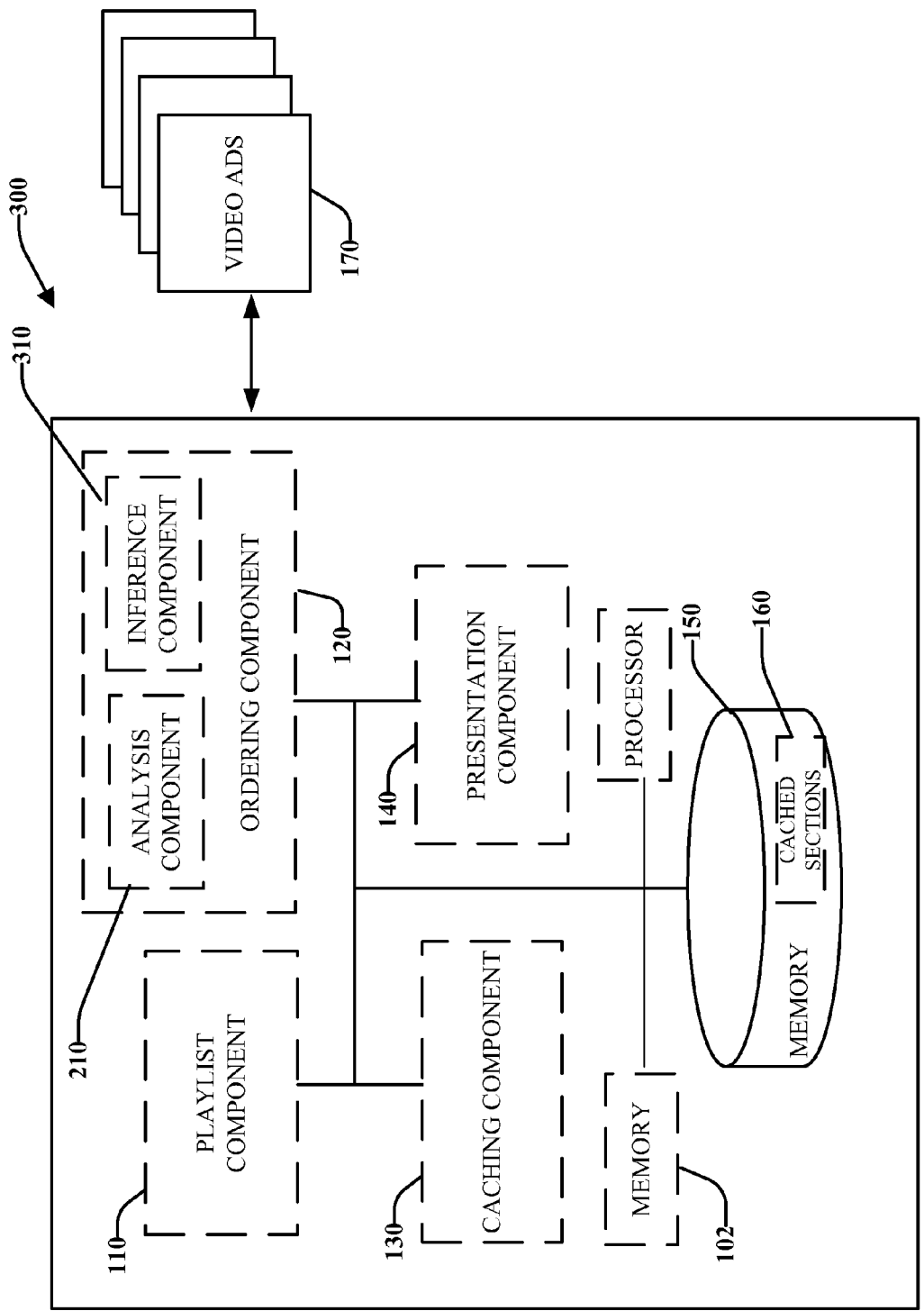
FIG. 3 illustrates a block diagram of an exemplary non-limiting system for identifying content sections of media files and/or video ads and making inferences in connection with ranking the content sections in accordance with an implementation of this disclosure.

With reference to FIG. 3, presented is another non-limiting example of an advertising delivery system 300 in accordance with the subject disclosure. Advertising delivery system 300 employs playlist component 110, ordering component 120, analysis component 210, inference component 310, caching component 130, presentation component 140, memory 102, memory 150, and cached sections 160. In an aspect, advertising delivery system 300 facilitates identifying content sections of media files and/or video ads and making inferences in connection with ranking the content sections. In a non-limiting example, ordering component 120 can employ an inference component 310 to facilitate making inferences or determinations in connection with ranking or ordering video ads of the playlist 170. In an aspect, inference component 310 can infer user desirability of a video ad based on a plurality of factors including but not limited to, user interest, monitored information including characteristics of media content (e.g., video ads) and features of media content, user preference, user demographics, user location, user viewing intent, or any other criteria associated with users, content, or video ads.

In order to provide for or aid in the numerous inferences described in this disclosure (for example, inferring characteristics associated with media files, video ads, and/or users), inference component 310 can examine the entirety or a subset of data to which it is granted access and can provide for reasoning about or inferring relevancy to and desirability of viewing respective content sections by respective content consumers. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events or data. Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, $x=(x1, x2, x3, x4, xn)$, to a confidence that the input belongs to a class, such as by $f(x)=\text{confidence}(\text{class})$. Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Figure 4:
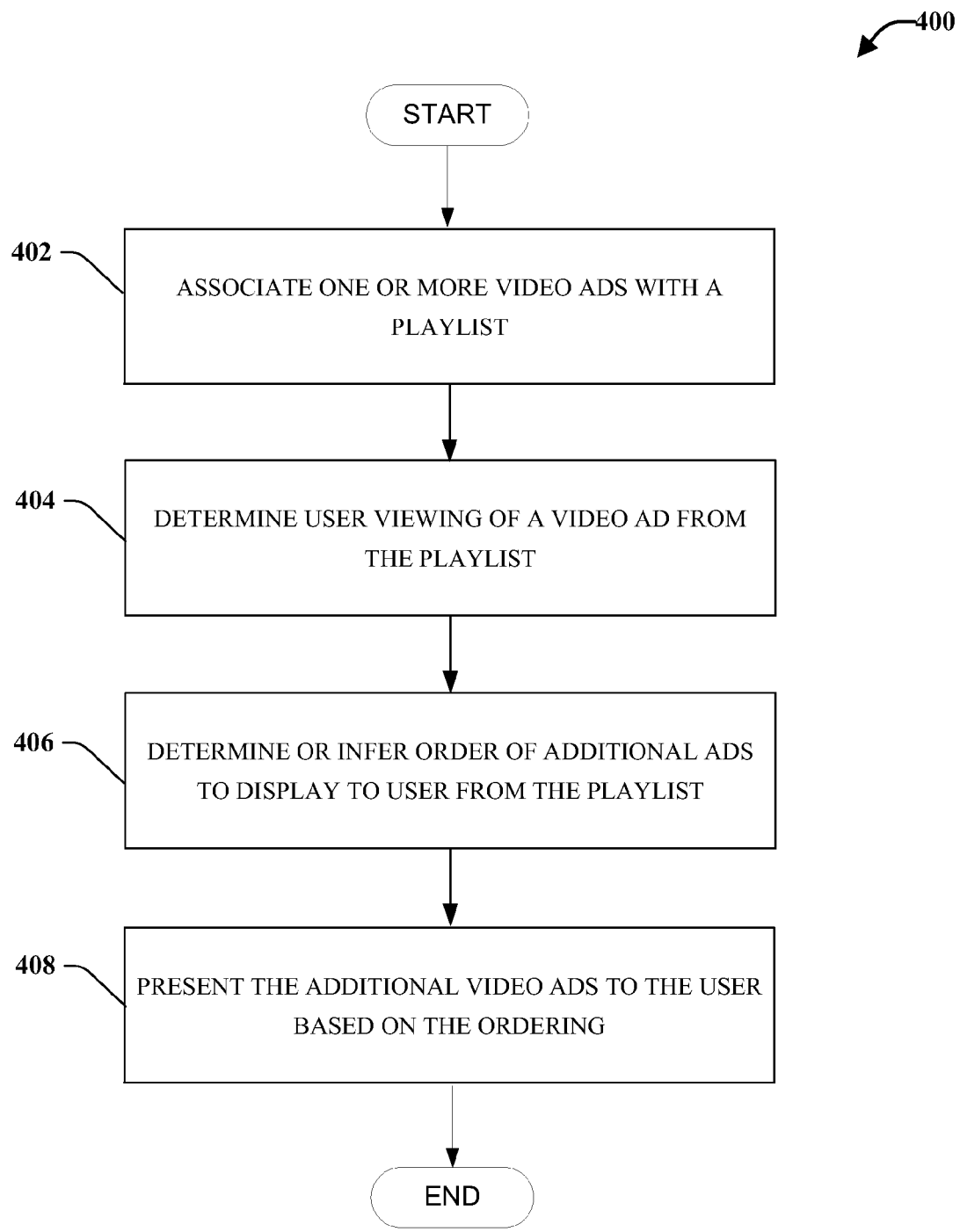
FIG. 4 illustrates an exemplary non-limiting flow diagram for presenting video advertisement in accordance with an implementation of this disclosure.
Figure 5:
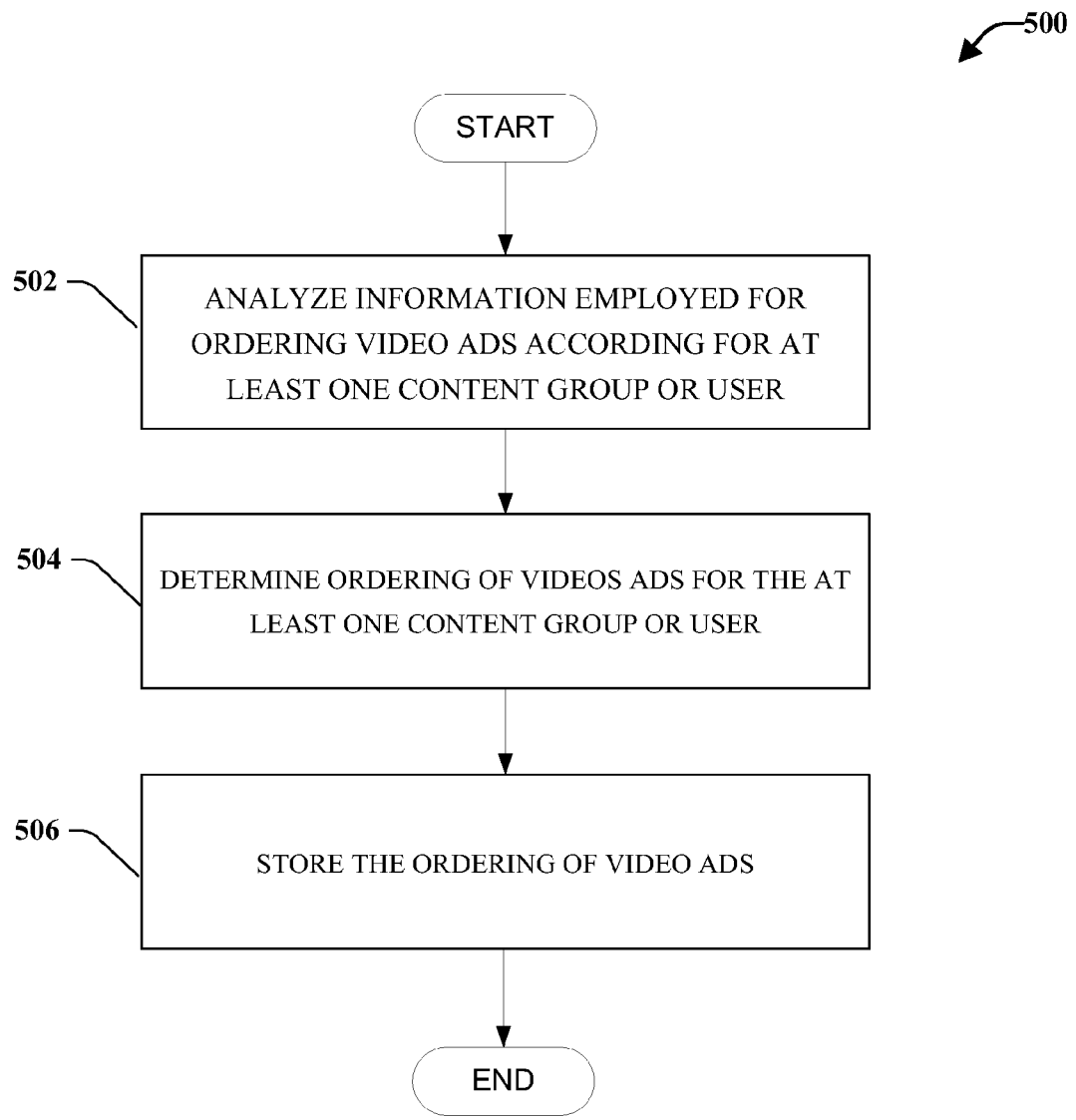
FIG. 5 illustrates an exemplary non-limiting flow diagram for determining order of video ads in accordance with an implementation of this disclosure.

FIGS. 4 and 5 illustrate various methodologies in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of inter-related states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 4, an exemplary methodology 400 for presenting video advertisements is depicted. At 402, one or more video ads are associated with a playlist of video ads (e.g., using presentation component 140). It is to be appreciated that the association can be performed well before the other acts described in connection with this flow diagram. Moreover, the association can be stored or indexed at a host device. At 404, a determination is made that a user is viewing a video ad associated with the playlist (e.g., using playlist component 110). At 406, after or during the user viewing the video ad, a determination or inference is made regarding order of additional ads from the playlist to present to the user (e.g., using ordering component 120). A variety of metrics that can be employed in connection with the ordering have been described above in connection with the advertising delivery systems 100, 200, and 300, and act 406 can employ these metrics and ordering techniques. At 408, the additional video ads of the playlist are presented to the user, for example, as a function or the ordering, user interest, or user selection. (e.g., using presentation component 140)

Referring now to FIG. 5, an exemplary methodology 500 for determining order of video ads is depicted. At 502, a plurality of video ads and information for ordering video ads are analyzed (e.g., using analysis component 210). At 504, a determination is made regarding the ordering of video ads based upon the analysis at 502 (e.g., using analysis component 210 and/or inference component 310). At 506, the ordering of the video ads is stored, for example, in a playlist, a content consumer group profile, or a user profile (e.g., using ordering component 120).

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 6:
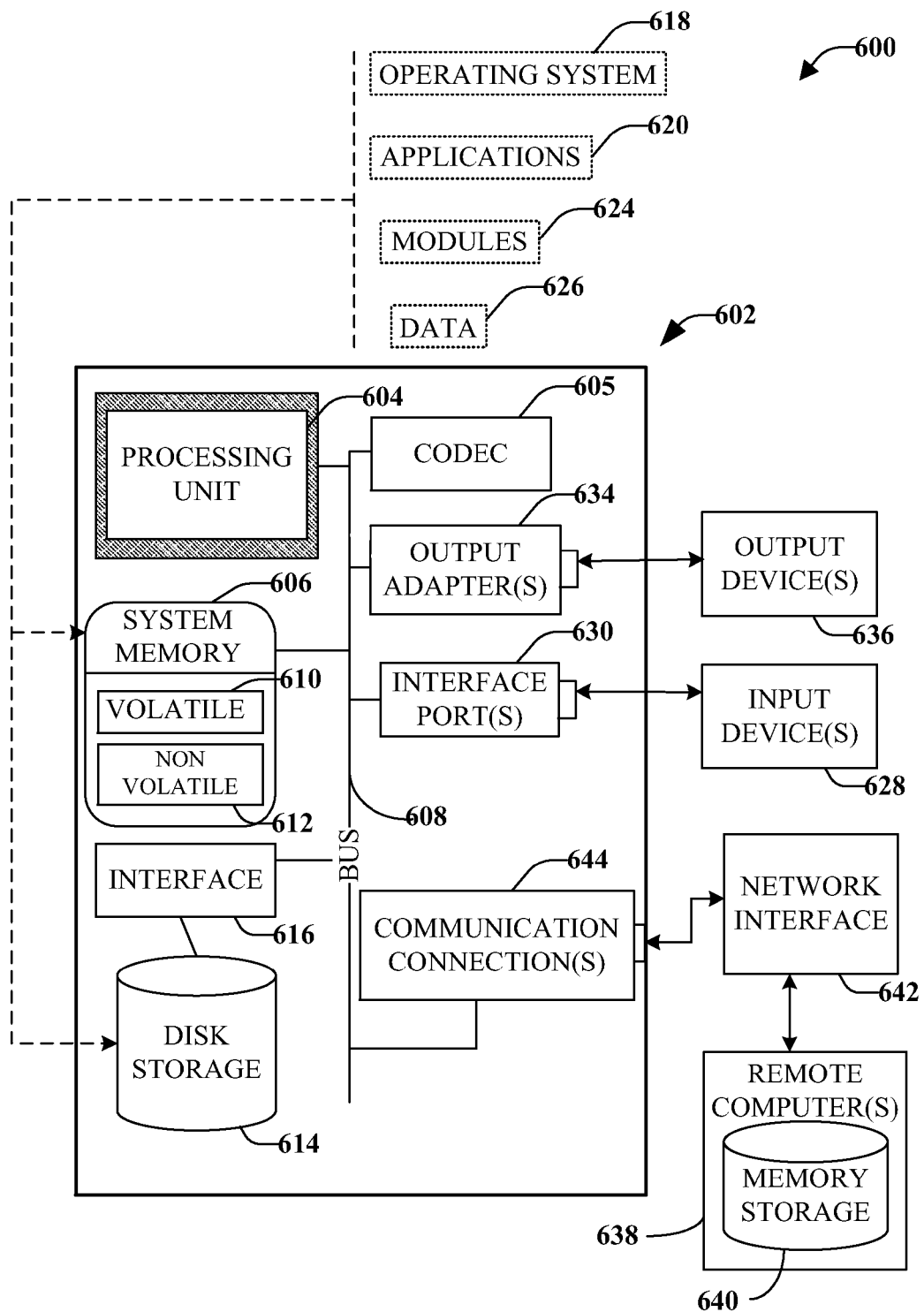
FIG. 6 illustrates a block diagram representing an exemplary non-limiting operating environment in which the various embodiments can be implemented.

With reference to FIG. 6, a suitable operating environment 600 for implementing various aspects of the claimed subject matter includes a computer 602. The computer 602 includes a processing unit 604, a system memory 606, a codec 605, and a system bus 608. In an embodiment, the computer 602 can for example be used to implement one or more of the systems or components shown or described in connection with FIGS. 1-3. The system bus 608 couples system components including, but not limited to, the system memory 606 to the processing unit 604. The processing unit 604 can be any of various available processors. Dual microprocessors and other multiprocessor architectures also can be employed as the processing unit 604.

The system bus 608 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 606 includes volatile memory 610 and non-volatile memory 612. The basic input/output system (BIOS), containing the basic routines to transfer information between elements within the computer 602, such as during start-up, is stored in non-volatile memory 612. In addition, according to present innovations, codec 605 may include at least one of an encoder or decoder, wherein the at least one of an encoder or decoder may consist of hardware, a combination of hardware and software, or software. Although, codec 605 is depicted as a separate component, codec 605 may be contained within non-volatile memory 612. By way of illustration, and not limitation, non-volatile memory 612 can include read only memory (ROM), programmable ROM (PROM), electrically programmable ROM (EPROM), electrically erasable programmable ROM (EEPROM), or flash memory. Volatile memory 610 includes random access memory (RAM), which acts as external cache memory. According to present aspects, the volatile memory may store the write operation retry logic (not shown in FIG. 6) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 602 may also include removable/non-removable, volatile/non-volatile computer storage medium. FIG. 6 illustrates, for example, disk storage 614. Disk storage 614 includes, but is not limited to, devices like a magnetic disk drive, solid state disk (SSD) floppy disk drive, tape drive, Jaz drive, Zip drive, LS-70 drive, flash memory card, or memory stick. In addition, disk storage 614 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 614 to the system bus 608, a removable or non-removable interface is typically used, such as interface 616.

It is to be appreciated that FIG. 6 describes software that acts as an intermediary between users and the basic computer resources described in the suitable operating environment 600. Such software includes an operating system 618. Operating system 618, which can be stored on disk storage 614, acts to control and allocate resources of the computer system 602. Applications 620 take advantage of the management of resources by operating system 618 through program modules 624, and program data 626, such as the boot/shutdown transaction table and the like, stored either in system memory 606 or on disk storage 614. It is to be appreciated that the claimed subject matter can be implemented with various operating systems or combinations of operating systems.

A user enters commands or information into the computer 602 through input device(s) 628. Input devices 628 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 604 through the system bus 608 via interface port(s) 630. Interface port(s) 630 include, for example, a serial port, a parallel port, a game port, and a universal serial bus (USB). Output device(s) 636 use some of the same type of ports as input device(s) 628. Thus, for example, a USB port may be used to provide input to computer 602, and to output information from computer 602 to an output device 636. Output adapter 634 is provided to illustrate that there are some output devices 636 like monitors, speakers, and printers, among other output devices 636, which require special adapters. The output adapters 634 include, by way of illustration and not limitation, video and sound cards that provide a means of connection between the output device 636 and the system bus 608. It should be noted that other devices and/or systems of devices provide both input and output capabilities such as remote computer(s) 638.

Computer 602 can operate in a networked environment using logical connections to one or more remote computers, such as remote computer(s) 638. The remote computer(s) 638 can be a personal computer, a server, a router, a network PC, a workstation, a microprocessor based appliance, a peer device, a smart phone, a tablet, or other network node, and typically includes many of the elements described relative to computer 602. For purposes of brevity, only a memory storage device 640 is illustrated with remote computer(s) 638. Remote computer(s) 638 is logically connected to computer 602 through a network interface 642 and then connected via communication connection(s) 644. Network interface 642 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 644 refers to the hardware/software employed to connect the network interface 642 to the bus 608. While communication connection 644 is shown for illustrative clarity inside computer 602, it can also be external to computer 602. The hardware/software necessary for connection to the network interface 642 includes, for exemplary purposes only, internal and external technologies such as, modems including regular telephone grade modems, cable modems and DSL modems, ISDN adapters, and wired and wireless Ethernet cards, hubs, and routers.

Figure 7:
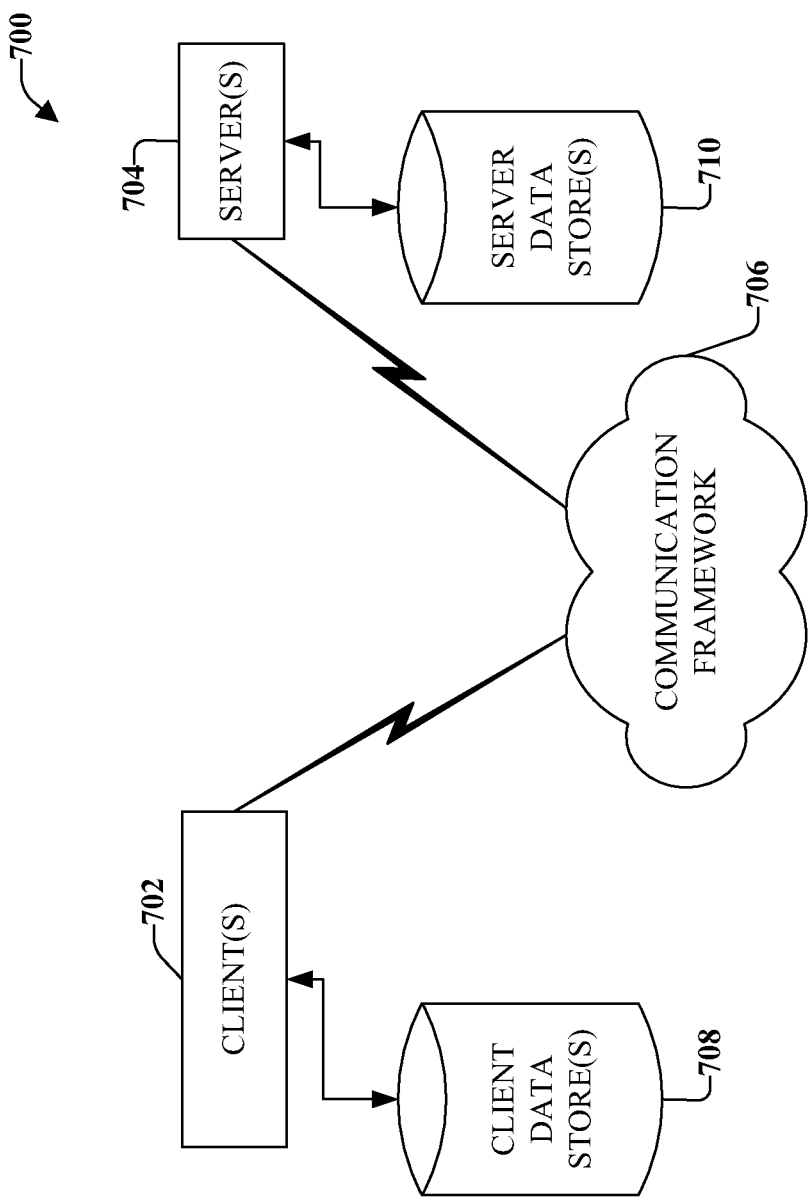
FIG. 7 illustrates a block diagram representing an exemplary non-limiting networked computing environment in which the various embodiments can be implemented.

Referring now to FIG. 7, there is illustrated a schematic block diagram of a computing environment 700 in accordance with this disclosure. The system 700 includes one or more client(s) 702 (e.g., laptops, smart phones, PDAs, media players, computers, portable electronic devices, tablets, and the like). The client(s) 702 can be hardware and/or software (e.g., threads, processes, computing devices). The system 700 also includes one or more server(s) 704. The server(s) 704 can also be hardware or hardware in combination with software (e.g., threads, processes, computing devices). The servers 704 can house threads to perform transformations by employing aspects of this disclosure, for example. One possible communication between a client 702 and a server 704 can be in the form of a data packet transmitted between two or more computer processes wherein the data packet may include video data. The data packet can include a metadata, e.g., associated contextual information, for example. The system 700 includes a communication framework 706 (e.g., a global communication network such as the Internet, or mobile network(s)) that can be employed to facilitate communications between the client(s) 702 and the server(s) 704.

Communications can be facilitated via a wired (including optical fiber) and/or wireless technology. The client(s) 702 include or are operatively connected to one or more client data store(s) 708 that can be employed to store information local to the client(s) 702 (e.g., associated contextual information). Similarly, the server(s) 704 are operatively include or are operatively connected to one or more server data store(s) 710 that can be employed to store information local to the servers 704.

In one embodiment, a client 702 can transfer an encoded file, in accordance with the disclosed subject matter, to server 704. Server 704 can store the file, decode the file, or transmit the file to another client 702. It is to be appreciated, that a client 702 can also transfer uncompressed file to a server 704 and server 704 can compress the file in accordance with the disclosed subject matter. Likewise, server 704 can encode video information and transmit the information via communication framework 706 to one or more clients 702.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a memory having stored thereon computer executable components; and
   a processor configured to execute the following computer executable components stored in the memory:
   a presentation component to associate one or more video advertisements with a playlist of video advertisements;
   a playlist component to monitor viewing events of the one or more video advertisements by a user;
   an inference component to determine an inferred interest of the user in unwatched video advertisements in the playlist of video advertisements based on monitoring the viewing events; and
   an ordering component to, subsequent to each viewing event of the one or more advertisements, determine an order for the unwatched video advertisements in the playlist of video advertisements based on the inferred interest;
   the presentation component further to present a subset of the unwatched video advertisements in the playlist of video advertisements to the user for viewing based on the determined order, wherein the unwatched video advertisements of the subset are selectable by the user from the playlist for viewing.

2. The system of claim 1, comprising a caching component that caches respective unwatched video advertisements of the playlist as a function of the determined order.

3. The system of claim 1, wherein the presentation component presents to the user a list of selectable respective unwatched video advertisements of the playlist, wherein the respective unwatched video advertisements are listed in the determined order.

4. The system of claim 1, wherein the ordering component determines the order based upon a content consumer group associated with the user.

5. The system of claim 1, wherein the ordering component determines the order based upon capabilities of a device employed by the user for watching of the one or more video advertisements.

6. The system of claim 1, wherein the inference component to determine the inferred interest further comprises the inference component to compute a probability distribution over states of interest based on a consideration of data and events corresponding to at least the user, characteristics of the video advertisements, features of media content, preferences of the user, user demographics, user location, and user viewing intent.

7. A method, comprising:
   associating, by a processor, one or more video advertisements with a playlist of video advertisements;
   monitoring viewing events of the one or more video advertisements by a user;
   determining an inferred interest of the user in unwatched video advertisement in the playlist of video advertisements based on the monitoring;
   determining, subsequent to each viewing event of the one or more advertisements, an order for the unwatched video advertisements in the playlist of video advertisements for viewing by the user-based on the inferred interest of the user; and
   presenting a subset of the unwatched video advertisements in the playlist of video advertisements to the user for viewing based on the determined order, wherein the unwatched video advertisements of the subset are selectable by the user from the playlist for viewing.

8. The method of claim 7, further comprising caching respective video advertisements of the playlist as a function of the determined order.

9. The method of claim 7, wherein presenting the subset of the unwatched video advertisements to the user comprises presenting a list of selectable respective unwatched video advertisements of the playlist, wherein the respective unwatched video advertisements are listed in the determined order.

10. The method of claim 7, further comprising determining the order based upon a content consumer group associated with the user.

11. The method of claim 7, further comprising determining the order based upon capabilities of a device employed by the user for watching of the one or more video advertisements.

12. The method of claim 7, wherein determining the inferred interest further comprises computing a probability distribution over states of interest based on a consideration of data and events corresponding to at least the user, characteristics of the video advertisements, features of media content, preferences of the user, user demographics, user location, and user viewing intent.

13. A non-transitory computer-readable medium having instructions stored thereon that, in response to execution, cause at least one device to perform operations comprising:
   associating, by a processor, one or more video advertisements with a playlist of video advertisements;
   monitoring viewing events of the one or more video advertisements by a user;
   determining an inferred interest of the user in unwatched video advertisement in the playlist of video advertisements based on the monitoring;
   determining, subsequent to each viewing event of the one or more advertisements, an order for the unwatched video advertisements in the playlist of video advertisements for viewing by the user-based on the inferred interest of the user; and
   presenting a subset of the unwatched video advertisements in the playlist of video advertisements to the user for viewing based on the determined order, wherein the unwatched video advertisements of the subset are selectable by the user from the playlist for viewing.

14. The non-transitory computer-readable medium of claim 13, wherein the operations further comprise caching respective video advertisements of the playlist as a function of the determined order.

15. The non-transitory computer-readable medium of claim 13, wherein presenting the subset of the unwatched video advertisements to the user comprises presenting a list of selectable respective unwatched video advertisements of the playlist, wherein the respective unwatched video advertisements are listed in the determined order.

16. The non-transitory computer-readable medium of claim 13, wherein the operations further comprise determining the order based upon a content consumer group associated with the user.

17. The non-transitory computer-readable medium of claim 13, wherein the operations further comprise determining the order based upon capabilities of a device employed by the user for watching of the one or more video advertisements.

18. The non-transitory computer-readable medium of claim 13, wherein the operations further comprise determining the inferred interest further comprises computing a probability distribution over states of interest based on a consideration of data and events corresponding to at least the user, characteristics of the video advertisements, features of media content, preferences of the user, user demographics, user location, and user viewing intent.

19. The system of claim 6, wherein the inference component to utilize a classifier to determine the inferred interest and to compute the probability distribution.

20. The method of claim 12, further comprising utilizing a classifier to determine the inferred interest and to compute the probability distribution.

* * * * *